US005796413A

United States Patent [19]

Shipp et al.

[11] Patent Number: 5,796,413

[45] Date of Patent: Aug. 18, 1998

[54] GRAPHICS CONTROLLER UTILIZING VIDEO MEMORY TO PROVIDE MACRO COMMAND CAPABILITY AND ENHANCHED COMMAND BUFFERING

[75] Inventors: Ronald Anthony Shipp; Stuart Hecht, both of Houston; Patrick Allen Harkin, Austin, all of Tex.

[73] Assignee: Compaq Computer Corporation, Houston, Tex.

[21] Appl. No.: 568,167

[22] Filed: Dec. 6, 1995

[51] Int. Cl.$^6$ .................................................. G06F 15/00

[52] U.S. Cl. ........................ 345/522; 345/516; 345/521

[58] Field of Search ................................ 395/501, 502, 395/507, 509, 511, 516, 520–522, 526, 250, 825, 872, 874, 412, 427; 345/501, 502, 507, 509, 511, 516, 520–522, 526; 711/202, 100

[56] References Cited

U.S. PATENT DOCUMENTS

| | | | |
|---|---|---|---|
| 5,299,309 | 3/1994 | Kuo et al. | 395/512 |
| 5,381,347 | 1/1995 | Gery | 364/514 A |
| 5,533,175 | 7/1996 | Lung et al. | 395/114 |

*Primary Examiner*—Kee M. Tung

*Attorney, Agent, or Firm*—Vinson & Elkins L.L.P.

[57] ABSTRACT

An apparatus and method are disclosed for buffering graphics commands in a video graphics system, and for implementing graphics macro commands. The invention makes use of off-screen portions of video memory to create a dynamic command FIFO for commands, and to store command sequences for later or repeated use ("macros"). A command FIFO controller is provided, along with an on-chip bus FIFO and an on-chip command buffer (which is also a FIFO). Several multiplexers are also provided, so as to enable the command FIFO controller to create several different paths for commands coming into the graphics controller. Incoming commands may be routed to the command execution circuitry in several different ways: through the bus FIFO and command buffer to the command execution circuitry, directly to the command execution circuitry by bypassing the bus FIFO and command buffer, or from the bus FIFO into video memory to be stored in a dynamic command FIFO and later retrieved and sent into the command buffer. The command FIFO controller is also provided with macro address generation logic for providing read pointers to macros stored in video memory, read and write address generation logic for accessing the dynamic command FIFO stored in video memory, status generation logic for use in controlling the dynamic command FIFO, and busy status logic for use in software synchronization

22 Claims, 11 Drawing Sheets

FIFO STATUS REGISTER (READ ONLY)

POLLING TOKEN REGISTER (WRITE ONLY)

| COMMAND MACRO FORMAT | | | |
|---|---|---|---|
| BIT(S) | FIELD | DECRIPTION | FORMAT |
| 63-60 | BYTE_ENABLE[3:0] | DESCRIBES WHICH BYTE(S) ARE TO BE WRITTEN. | 1=BYTE IS ACTIVE. EX, 1111 (BINARY) INDICATES ALL FOUR BYTES WRITTEN |
| 59 | MACRO_CMD | INDICATES WHETHER MACRO DWORD IS A COMMAND OR END OF MACRO TOKEN | 1=COMMAND; 0=END OF COMMAND TOKEN |
| 58 | DFB_ADDR | INDICATES WHETHER THE CYCLE IS A DFB MEMORY ACCESS | 1=OTHER MEMORY ACCESS 0=DFB ACCESS |
| 57 | ROM_DECD | INDICATES A WRITE (0) TO PROGRAMMABLE ROM. | ALWAYS 1 |
| 56 | HI_MAP | INDICATES WHETHER LOW MAP AREA (BELOW 1M) OR HIGH MAP AREAS (ABOVE 1M) IS BEING ACCESSED AND IS INDICATED BY THE HOST_ADDR FIELD | 1=LOW MAP ACCESS (MEMORY OR REGISTER); 0=HIGH MAP ACCESS (MEMORY OR REGISTER). |
| 55-34 | HOST_ADDR[23:2] | CONTAINS THE ADDRESS INDICATED BY THE HOST. INTERPRETED ACCORDING TO OTHER COMMAND FIELDS | BITWISE INVERTED – E.G., A WRITE TO HOST ADDRESS 0xB0F40 IS STORED AS 0x4F0BD. |
| 33 | HOST_MEM_CYC | INDICATES HOST MEMORY CYCLE (1) | 1=CYCLE IS A HOST MEMORY CYCLE; 0 INDICATES OTHER CYCLE TYPE. |
| 32 | HOST_IO_CYC | INDICATES HOST IO (REGISTER) CYCLE (1) | 1=CYCLE IS A HOST IO (REGISTER) CYCLE; 0 INDICATES OTHER CYCLE TYPE. |
| 31-0 | HOST_WRITE_DATA | 32-BIT DATA TO BE WRITTEN. | BYTES ARE ALIGNED TO THEIR POSITION WITHIN A DWORD, BYTE ENABLES CONTROL WHICH BYTES HAVE AN EFFECT. NON-WRITTEN BYTES ARE DON'T CARE VALUES. DATA IS INVERTED – E.G., TO WRITE 0x00AAFFBB, 0xFF550044 IS STORED. |

FIG. 15

GRAPHICS CONTROLLER UTILIZING VIDEO MEMORY TO PROVIDE MACRO COMMAND CAPABILITY AND ENHANCHED COMMAND BUFFERING

FIELD OF THE INVENTION

This invention relates generally to computer systems, and more particularly to the buffering of video commands and the implementation of macro command capability in high-performance video graphics systems.

BACKGROUND OF THE INVENTION

Recent years have seen an ever increasing demand for graphics performance in computer systems, due mainly to increases in CPU speed and the growing popularity of graphical user interfaces and graphics-oriented applications. In attempting to meet this demand, system designers have pursued two basic approaches.

First, new bus protocols have been defined that are operable over very high bandwidths so that data and control signals may be transferred from the CPU to the graphics system at much faster rates. Some bus protocol known popularly as "local bus" protocols, have been defined to run with bus frequencies as high as the clock frequency of the CPU. By way of example, the Peripheral Component Interconnect ("PCI") bus is a local bus standard recently developed by Intel Corporation. Over a PCI bus, data transfer rates of up to 266 Mbytes per second are possible under optimum conditions with a 64-bit data bus. A PCI bus does not, however, always run at the CPU clock frequency.

Second, designers have developed graphics accelerators and graphics processors (both hereinafter referred to as "graphics controllers"). The purpose of a graphics controller is to relieve the CPU of some of the more mundane operations required in picture formation and manipulation. In systems using a graphics controller, for example, the CPU may create a colored rectangle on the display merely by transferring the corner coordinates and color value to the graphics controller. The graphics controller then carries out the remaining calculations and video memory manipulations necessary to create the picture, thus decreasing the overall bus bandwidth required for graphics operations in the computer system.

Even with the use of local busses and graphics controllers, however, computer graphics systems continue to lack the performance necessary to keep pace with the ever-increasing processing speeds of state-of-the-art CPUs. It takes time for the graphics controller to execute each command issued to it by the CPU. Therefore, in a computer system having a fast CPU and a fast bus transfer rate, commands may be issued to the graphics controller faster than the controller can execute them. This can degrade overall system performance because the CPU must then wait until the graphics controller has finished executing the last-issued video command before the CPU sends it another command. In such a situation, either the CPU must sit idle or the video driver software must include overhead in the form of routines designed to enable the CPU to execute limited other tasks during the wait. Neither result is highly desirable.

Some graphics controllers have been designed using a single on-chip FIFO buffer for temporarily storing commands between the time they are received from the bus and the time they are executed by the graphics controller. This type of design enhances system performance to some degree because it can enable the CPU to send a series of video commands to the graphics controller using a burst bus cycle, for example, even though the graphics controller cannot execute all of the commands as fast as they are received. The commands received during the burst are simply stored in the graphics controller's single on-chip FIFO buffer until they are executed by the controller in sequence. While the single on-chip FIFO buffer design has merit, its usefulness is limited for a number of reasons. First, implementing an on-chip FIFO buffer on the graphics controller chip is expensive because the buffer necessarily takes up space that could be used for other functionality. Consequently, on-chip buffers are usually small. Therefore, long or consecutive bursts of video commands quickly fill the on-chip buffer, resulting in the same bottleneck that the buffer was designed to prevent. Second, the single on-chip FIFO buffer lacks flexibility because of its fixed size, and because providing alternate or enhanced modes of operation for such a FIFO requires additional hardware.

SUMMARY OF THE INVENTION

The invention utilizes portions of off-screen video memory in two different ways: to create a large, variable-sized (dynamic) video command FIFO for temporary storage of video commands, and to provide the capability for defining and using video macro commands. A large video command buffer is created in video memory by the graphics controller, enabling the graphics system to receive large and consecutive bursts of graphics commands from the CPU without causing the CPU to wait until previous commands are executed by the graphics controller. The variable size of the buffer so created allows the invention to be used with various different system configurations having various amounts of unused video memory available. Moreover, the macro command capability of the invention enables users to custom-define numerous special sequences of graphics commands ("macros"), and to store the command sequences in unused portions of video memory. After this has been done, the CPU can cause the graphics controller to execute these command sequences automatically simply by issuing a single command to the graphics controller identifying which macro is desired. Bus traffic associated with repetitive graphics operations is thereby significantly reduced.

In a preferred embodiment, a graphics controller is provided having two on-chip FIFO buffers (a bus FIFO and a command buffer), each with a bypass capability. A command FIFO controller and several multiplexers are also provided. The multiplexers are configured such that address and control signals normally provided to the graphics controller core by the command decoder may be replaced temporarily with address and control signals provided by the command FIFO controller, while data signals normally provided by the command decoder are temporarily replaced with data signals provided by the output of the bus FIFO. The output of the command buffer always feeds the command decoder, but the input of the command buffer may be taken either from the output of the bus FIFO or from video memory. Using this configuration, graphics commands coming from the graphics controller's bus interface may be routed either (1) directly to the graphics controller core, bypassing the on-chip FIFOs for immediate execution, (2) to the graphics controller core after first passing through one or both of the on-chip FIFOs, or (3) to the controller core after first passing through the bus FIFO, then through the dynamic command FIFO in video memory and finally through the command buffer. Moreover, because the input of the command buffer may be taken from video memory, and because video memory address and control signals may be provided by the command FIFO controller, macros may be stored in video memory and recalled later for execution. The command FIFO controller is a state machine and operates both of the on-chip FIFOs, as well as all of the multiplexers, in order to implement the above-described functionality. Several memory-mapped I/O registers are also provided for use by the host in setting and reading the configuration and status of the system.

BRIEF DESCRIPTION OF THE DRAWINGS

FIG. 15 is a table describing a preferred bit field specification for a 64-bit macro command according to a preferred embodiment of the invention.

DETAILED DESCRIPTION OF THE PREFERRED EMBODIMENTS

The preferred embodiments of the invention will now be described with reference to FIGS. 1–16 of the drawings, like numerals being used therein for like and corresponding parts.

General Structure and Operation of Video Graphics Systems

Figure 1:
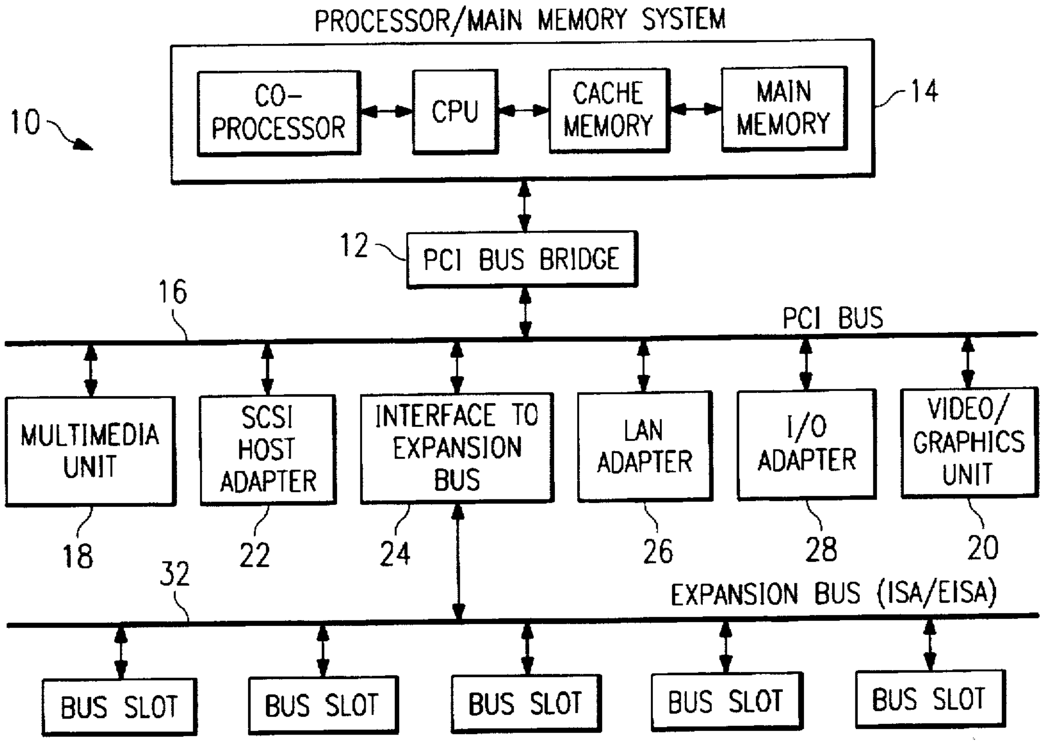
FIG. 1 (PRIOR ART)
FIG. 1 is a block diagram of a computer system in which a graphics system is coupled to the CPU via a local bus.

FIG. 1 is a block diagram illustrating the basic structure of a computer system 10 utilizing a PCI bus. In such a system, PCI bus bridge 12 represents the connection between processor/main memory system 14 and PCI bus 16. All of the peripheral components that require extremely high bus bandwidth are configured as PCI units and connected to PCI bus 16. For example, in computer system 10, six such PCI units are represented by multimedia unit 18, SCSI host adapter 22, expansion bus interface 24, LAN adapter 26, I/O adapter 28 and video graphics unit 20. Because expansion bus interface 24 is a PCI unit, expansion bus 32 may be considered to be another type of PCI device whether the expansion bus is of the ISA, EISA, MICROCHANNEL or other type. In addition to the memory and I/O address space already specified for systems using 80×86 CPU's, a PCI system also requires a configuration address area, in which 256 bytes is provided for PCI configuration registers for each PCI unit. Using the PCI configuration address area, the CPU can access the PCI configuration registers for each PCI unit.

Figure 2:
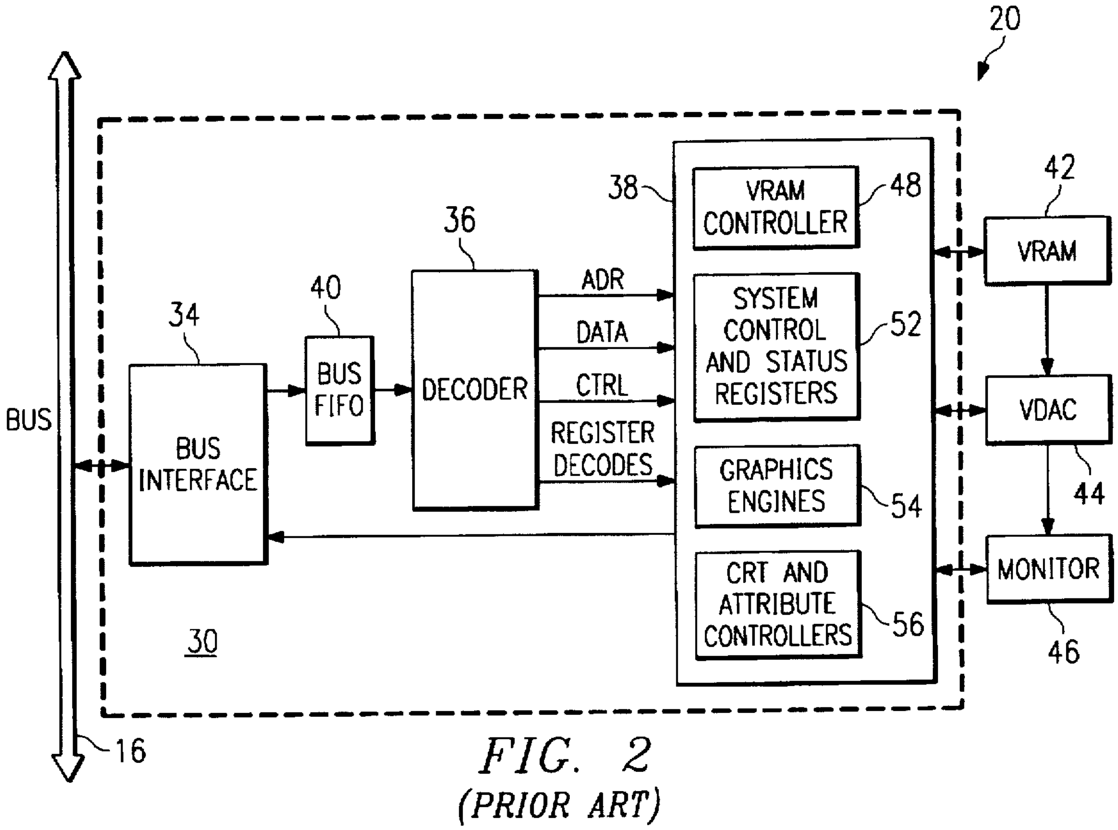
FIG. 2 (PRIOR ART)
FIG. 2 is a block diagram of a prior art graphics system in which the graphics controller includes a single on-chip FIFO buffer.

FIG. 2 is a block diagram illustrating the basic structure of a prior art video graphics system 20. Video graphics system 20 incorporates a graphics controller 30 as well as other well-known graphics system components such as video memory (hereinafter "VRAM") 42, video digital-to-analog converter (hereinafter "VDAC") 44 and monitor 46. As can be seen in FIG. 2, a graphics controller 30 generally includes a bus interface 34 for interpreting and generating the control signals necessary for video system 20 to interact with bus 16 (or bus 32 in non-local bus systems). Graphics controller 30 also generally includes a decoder 36 and a graphics core 38. For simplicity of illustration, several well-known functional sub-blocks of graphics controller 30 are shown residing within graphics core 38. VRAM controller 48 controls reads and writes of data between VRAM 42 and graphics controller 30. System control and status registers 52 set and report the configuration, status and modes of operation for graphics controller 30. Graphics engines 54 accelerate graphics operations and can include such sub-modules as a line draw engine for accelerating the drawing of lines in VRAM 42, a bit block transfer or "BITBLT" engine for transferring blocks of pixel data from one part of VRAM 42 to another, a text engine for drawing text into VRAM 42, and a polygon fill engine for accelerating the creation of geometrical shapes within VRAM 42. CRT and attribute controllers 56 provide low-level control signals such as vertical and horizontal blanking and synchronization for monitor 46, as well as blinking, highlighting and reverse video functions for data issuing from VRAM 42. Generally, graphics controller 30 is implemented as a single ASIC device.

The CPU controls the configuration and operation of graphics controller 30 by writing appropriate data to system control and status registers 52. The CPU may read status information from system control and status registers 52, and may also read and write information to and from address locations within VRAM 42. Each such read or write operation, whether directed to system control and status registers 52 or to locations in VRAM 42, is a video "command." Thus, each video command generally corresponds to a bus cycle sent from the CPU to graphics controller 30 via bus 16. (The exception is that burst bus cycles may contain several video commands.) Whenever a command is sent to graphics controller 30, bus interface 34 captures all of the information that characterizes the command (read/write, address and data information) and then forwards that information to decoder 36 and graphics core 38 for execution. Decoder 36 parses the command and generates the necessary address, data, control and enable signals necessary to accomplish the action required by the command.

In graphics controllers that use on-chip buffering, a bus FIFO 40 is placed in the command path between the bus interface 34 and the decoder 36. With this configuration, each command received from bus interface 34 is temporarily stored in bus FIFO 40 before it finally passes to decoder 36 in a sequential "first-in-first-out" fashion. Some commands, however, should not be buffered. (Hereinafter, these are referred to as "immediate" commands or cycles.) For example, read commands require that an immediate response be given to the CPU. Thus, bus FIFO 40 is typically provided with a bypass capability to be used for immediate commands such that the immediate commands can be routed around the FIFO directly to decoder 36 for execution.

Figure 3:
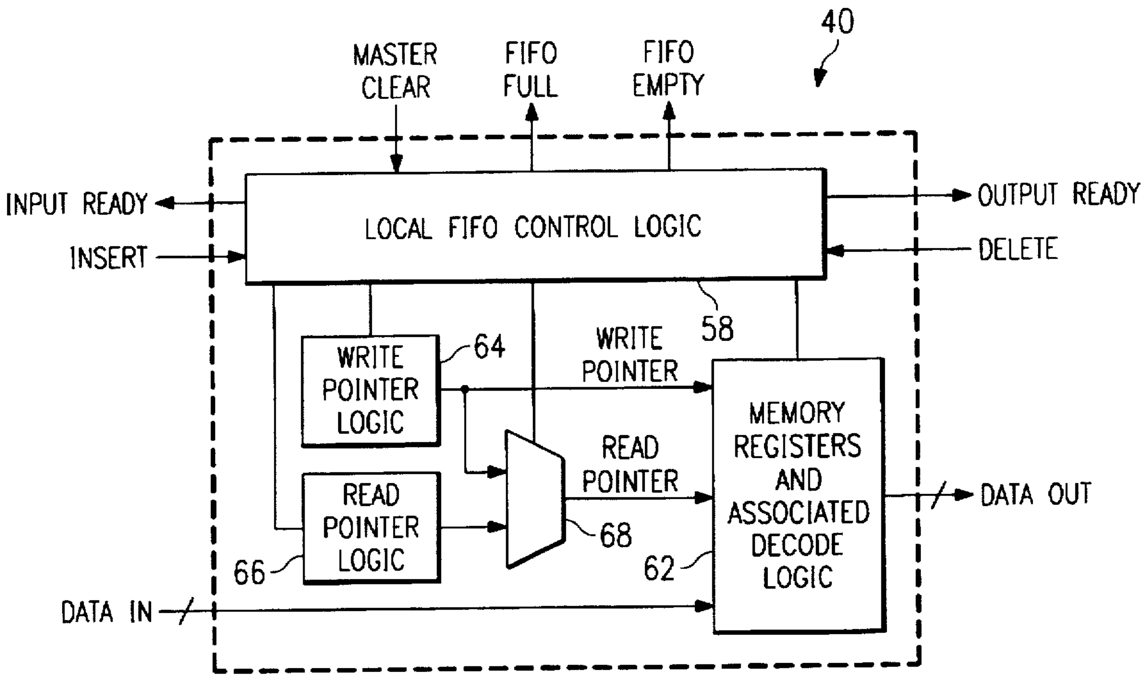
FIG. 3 (PRIOR ART)
FIG. 3 is a block diagram showing the on-chip FIFO buffer of FIG. 2 in more detail.

One type of hardware arrangement for providing the bypass capability is shown in FIG. 3. As can be seen in FIG. 3, bus FIFO 40 contains local FIFO control logic 58, memory registers and associated decode logic 62, write pointer logic 64, read pointer logic 66 and a multiplexer 68. Both write pointer logic 64 and read pointer logic 66 are initialized to point to the same memory register in logic 62. Each time a data word is loaded into bus FIFO 40, write pointer logic 64 increments the write pointer to point to the next register in logic 62. Each time a data word is read from bus FIFO 40, read pointer logic 66 increments the read pointer. In this manner, the read pointer always points to the oldest data in bus FIFO 40. When the bypass signal is asserted, however, multiplexer 68 is switched so that the read pointer provided to memory register logic 62 is actually the same value as the write pointer, and neither the read pointer nor the write pointer are incremented. Thus, while the bypass signal is asserted, the same data may be written into bus FIFO 40 and then immediately read out of bus FIFO 40.

In prior art graphics systems, the purpose of bus FIFO 40 was to enhance the performance of video graphics system 20 when the CPU sent a series of closely-spaced commands to video graphics system 20. Such a series of commands can be delivered faster than video graphics system 20 can execute them, especially when the commands are sent in a burst mode bus cycle. When such a situation occurs, the first command may begin execution immediately within graphics controller 30, while subsequent commands in the series are stored in bus FIFO 40. Optimally, by the time the CPU sends another series of video commands, graphics controller 30 will have had time to execute all of the commands stored in bus FIFO 40 so that the process can be repeated. The benefit of this design is that the CPU is not caused to wait for graphics controller 30 to complete its execution of each command before the CPU sends another command, thus resulting in less waste of CPU time and a commensurate increase in overall computer system performance. As discussed above, however, such designs do not provide optimum graphics performance in systems utilizing fast CPUs and fast bus transfer rates.

Structure of Enhanced Video Graphics System

Figure 4:
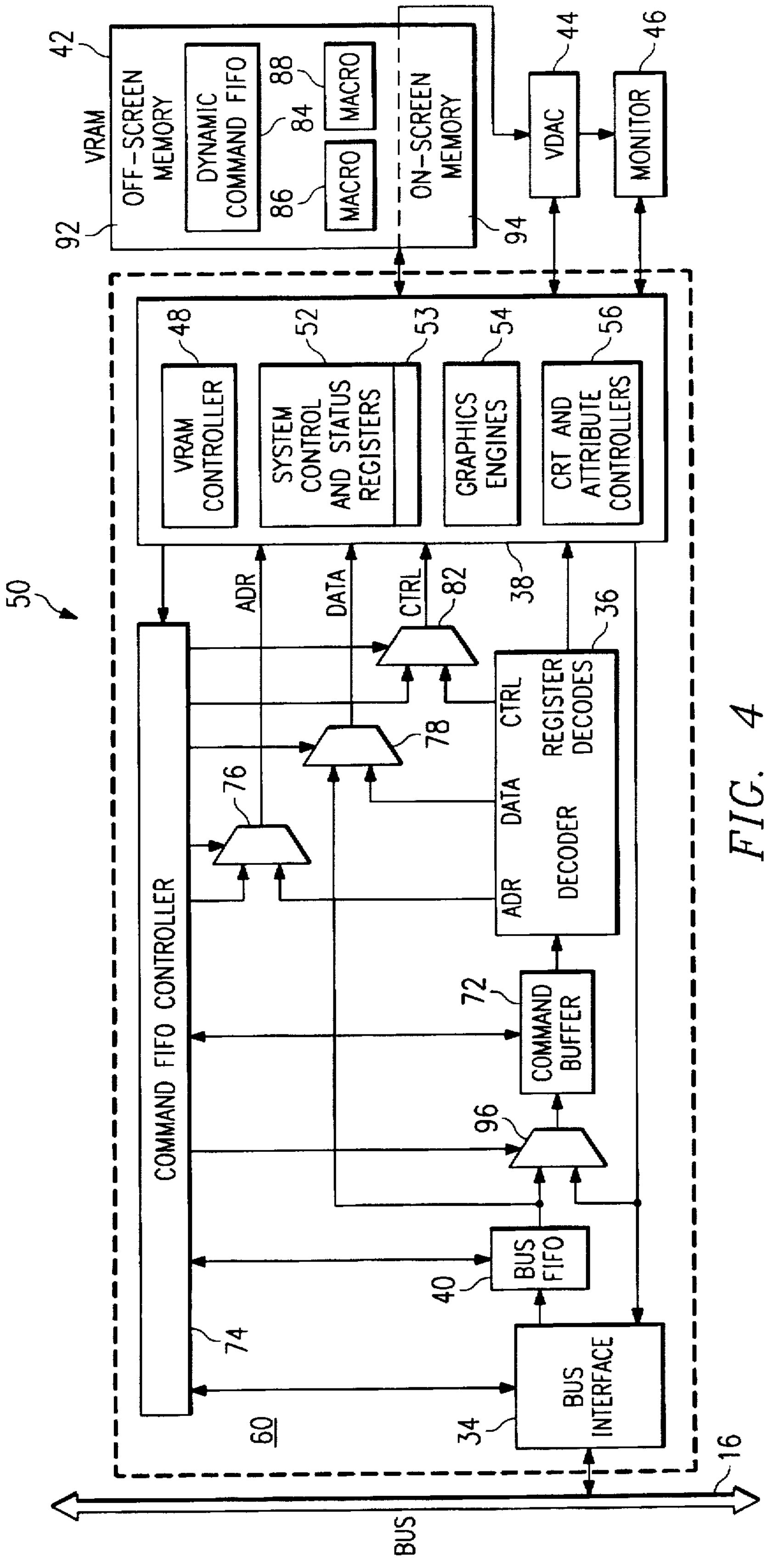
FIG. 4 is a block diagram of a graphics system according to a preferred embodiment of the invention.

FIG. 4 is a block diagram illustrating a video graphics system 50 according to a preferred embodiment of the invention. In addition to the above-described components conventionally found in graphics controllers, graphics controller 60 includes command buffer 72, command FIFO controller 74, additional control and status registers 53, and multiplexers 76, 78, 82 and 96. VRAM 42 has an off-screen memory area 92 and an on-screen memory area 94. Within off-screen memory area 92 is a dynamic command FIFO 84 and numerous macros, represented in the drawing by macros 86 and 88. Dynamic command FIFO 84 and macros 86 and 88 are placed in off-screen memory 92 by graphics controller 60 in a fashion to be described in more detail below.

Command buffer 72 may be any FIFO buffer with a bypass capability. Preferably, the design of command buffer 72 should be similar or identical to that of bus FIFO 40. The output of bus interface 34 is coupled to the input of bus FIFO 40 as well as to command FIFO controller 74. The input of bus interface 34 is taken from graphics controller core 38. The output of command buffer 72 is coupled to the input of decoder 36.

Multiplexer 96 provides the input to command buffer 72. One of the inputs to multiplexer 96 is coupled to the output of bus FIFO 40, while the other input of multiplexer 96 is taken from graphics controller core 38. Thus, depending on the control signals applied to multiplexer 96, the input to command buffer 72 may be provided either by bus FIFO 40 or by graphics controller core 38.

Multiplexer 76 provides address inputs to graphics controller core 38. One of the inputs of multiplexer 76 is coupled to decoder 36, while the other input is coupled to command FIFO controller 74. Thus, depending on the control signals applied to multiplexer 76, the address inputs to graphics controller core 38 may be provided either by decoder 36 or by command FIFO controller 74.

Multiplexer 78 provides data inputs to graphics controller core 38. One of the inputs to multiplexer 78 is coupled to the output of bus FIFO 40, while the other input is coupled to decoder 36. Thus, depending on the control signals applied to multiplexer 78, the data inputs to graphics controller core 38 may be provided either by decoder 36 or by bus FIFO 40.

Multiplexer 82 provides control inputs to graphics controller core 38. One of the inputs to multiplexer 82 is coupled to decoder 36, while the other input is coupled to command FIFO controller 74. Thus, depending on the control signals applied to multiplexer 82, the control inputs to graphics controller core 38 may be provided either by decoder 36 or by command FIFO controller 74.

Figure 5:
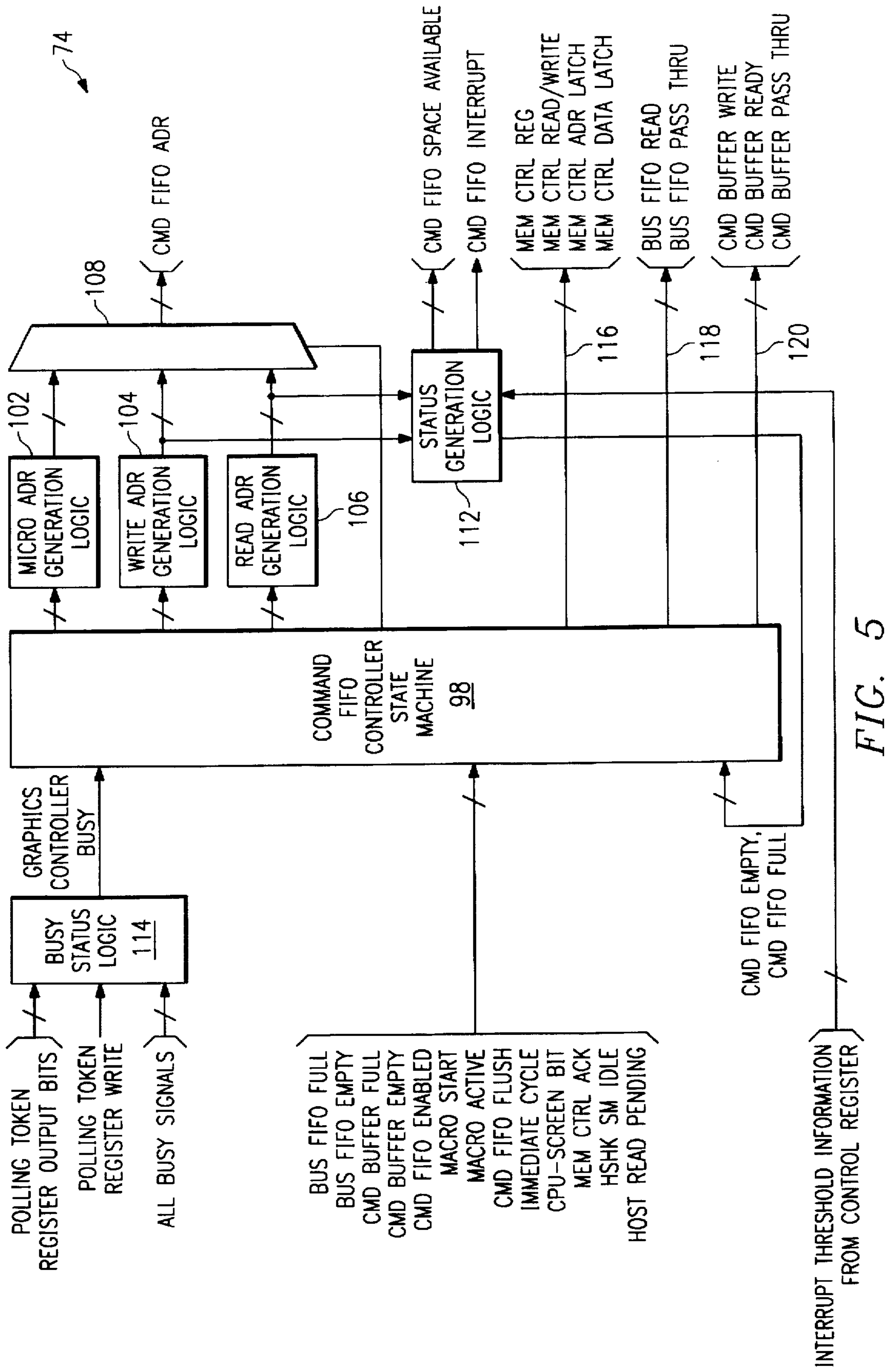
FIG. 5 is a block diagram showing the command FIFO controller of FIG. 4 in more detail.

FIG. 5 is a block diagram illustrating command FIFO controller 74 in more detail. State machine 98 is coupled to busy status logic 114, macro address generation logic 102, write address generation logic 104, read address generation logic 106 and status generation logic 112. COMMAND FIFO ADDRESS, which is sent to one input of multiplexer 76, is taken from the output of multiplexer 108. The three inputs of multiplexer 108 are coupled to macro address generation logic 102, write address generation logic 104 and read address generation logic 106, respectively. Thus, depending on the control signals applied to multiplexer 108, COMMAND FIFO ADDRESS may be provided by either macro address generation logic 102, write address generation logic 104 or read address generation logic 106.

The purpose and function of write address generation logic 104 and read address generation logic 106 are analogous to that of write pointer 64, and read pointer logic 66. Responsive to information stored in FIFO start address register 124 (to be further discussed below) and the number of commands currently stored in dynamic command FIFO 84, they provide the read and write pointers necessary to implement the first-in-first-out storage function of dynamic command FIFO 84, using an available portion of off-screen memory 92. In turn, the purpose of macro address generation logic 102 is to provide the addresses necessary to access macros stored in VRAM 42, such as macros 86 and 88, during the execution of the macros.

Status generation logic 112 is coupled to the outputs of write address generation logic 104 and read address generation logic 106, and calculates the remaining number of commands that may be stored in dynamic command FIFO 84 before an overflow occurs (CMD FIFO SPACE AVAILABLE). Having done this, status generation logic 112 is able to generate an interrupt if CMD FIFO SPACE AVAILABLE falls below a predetermined threshold, and is also able to generate the signals CMD FIFO FULL and CMD FIFO EMPTY if dynamic command FIFO 84 becomes full or empty, respectively.

State machine 98 generates control outputs 116, 118 and 120 for use by other components of graphics controller 60. For example, control signals 116 are coupled to one input of multiplexer 82 for use by controller core 38 in manipulating VRAM 42 to implement dynamic command FIFO 84 and macros 86 and 88. Control signals 118 are coupled to bus FIFO 40 to control when data is to be output by bus FIFO 40 and whether bus FIFO 40 operates in first-in-first-out mode or bypass ("passthru") mode. Control signals 120 are coupled to command buffer 72 to control when data is input to and output from command buffer 72 and whether command buffer 72 operates in first-in-first-out mode or bypass mode.

The operation of state machine 98 is responsive to numerous inputs:

The BUS FIFO FULL, BUS FIFO EMPTY, CMD BUFFER FULL and CMD BUFFER EMPTY signals indicate whether bus FIFO 40 or command buffer 72 is full or empty, respectively. Preferably, these signals are identical to or responsive to corresponding signals generated in bus FIFO 40 and command buffer 72.

CMD FIFO FULL indicates that dynamic commands FIFO 84 has been filled. (It should be noted that each of the full signals, BUS FIFO FULL, CMD BUFFER FULL and CMD FIFO FULL may be implemented such that the signals assert prior to complete filling of corresponding FIFO, in order to allow the hardware time to correct the problem before an overflow occurs.) CMD FIFO EMPTY indicates that dynamic command FIFO 84 is empty.

CMD FIFO ENABLED is responsive to the state of bits 8, 9 and 10 in FIFO control register 122 and indicates whether the use of dynamic command FIFO 84 has been enabled.

MACRO START is asserted when the command that will next enter command buffer 72 is a write to macro address register 126. MACRO ACTIVE is generated by state machine 98 and is asserted throughout the execution of a macro (from the time macro address register 126 is written to until an end-of-macro token is encountered). When MACRO ACTIVE is asserted, command FIFO controller 74 switches multiplexer 108 so that read addresses come from macro address generation logic 102 rather than from read address generation logic 106. (Write addresses will still come from write address generation logic 104, even during macro execution.)

CMD FIFO FLUSH is asserted whenever an immediate command is present in bus FIFO 40. IMMEDIATE CYCLE is asserted when the command currently exiting bus FIFO 40 is an immediate command. (Both CMD FIFO FLUSH and IMMEDIATE CYCLE are used during a flush of bus FIFO 40, as will be discussed further below.) Preferably, the following types of commands should be treated as immediate (non-bufferable) commands: all read commands, all reads or writes to VDAC 44, all reads or writes to the PCI configuration space, all writes to FIFO control register 122, all writes to FIFO start address register 124, all writes to the video register set (such as a Video Media Channel register set, if any), and all writes to the coprocessor register set (such as the register set associated with a 3-D graphics coprocessor, if any).

CPU-SCREEN BLT is used in a preferred embodiment in order to cause state machine 98 to ignore graphics engine busy signals during a CPU-screen bit block transfer operation. During such an operation, state machine 98 will use CPU-SCREEN BLT, instead of the engine busy signals, as the indicator of whether and when more data may be sent to decoder 36.

MEM CTRL ACK is a handshake signal used in controlling interaction between command FIFO controller 74 and VRAM controller 48.

HSHK SM IDLE is a handshake signal used in controlling interaction between command FIFO controller 74 and decoder 36.

HOST READ PENDING indicates to state machine 98 that the host (CPU) has issued a read command. When such a read is requested, graphics controller 60 will either instruct the requesting entity to retry (for example, when VRAM controller 48 is busy and the read would violate bus latency requirements), or command FIFO controller 74 will place both bus FIFO 40 and command buffer 72 in bypass mode so that the read command will be transmitted to decoder 36 for execution immediately.

"Polling Token Register Output Bits" refers to the bits of polling token register 130.

POLLING TOKEN REGISTER WRITE is a signal that is asserted to indicate that polling token register 130 has just been written.

"All Busy Signals" refers to the busy signals that are generated by graphics engines 54 and any buffers associated therewith.

GRAPHICS CONTROLLER BUSY is generated by busy status logic 114. Its purpose and effect is to prevent state machine 98 from sending new commands to graphics controller core 38 until it is appropriate to do so. Its assertion is dependent in part on the mode of software synchronization being used. (This will be further discussed below in relation to software synchronization.)

Figure 6:
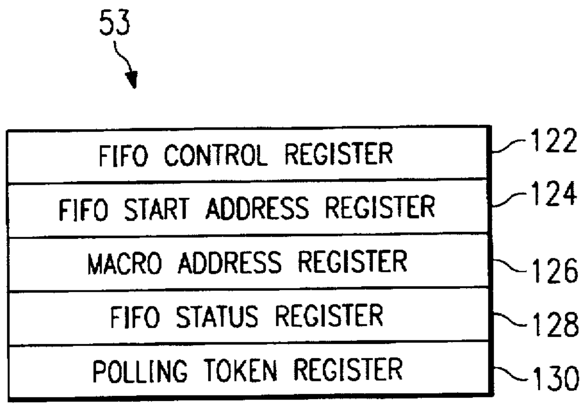
FIG. 6 is a block diagram showing the additional status and control registers of FIG. 4 in more detail.

FIG. 6 is a block diagram illustrating additional status and control registers 53 in more detail As can be seen from the drawing, additional status and control registers 53 include FIFO control register 122, FIFO start address register 124, macro address register 126, FIFO status register 128 and polling token register 130. Preferably, these physical I/O registers are mapped into the memory address space of computer system 10. Specifically, such registers may be mapped into the address space allocated for VRAM 42. For example, in systems configured for 1 Mbyte of video memory, 512 I/O registers would typically be memory mapped beginning at 1 M-512 in the address space allocated for VRAM 42. A similar allocation scheme would be used for Systems having larger video memories. Once the memory allocation scheme is chosen, it is implemented by making appropriate modifications to system control and status registers 52.

Figures 7, 8, 9:
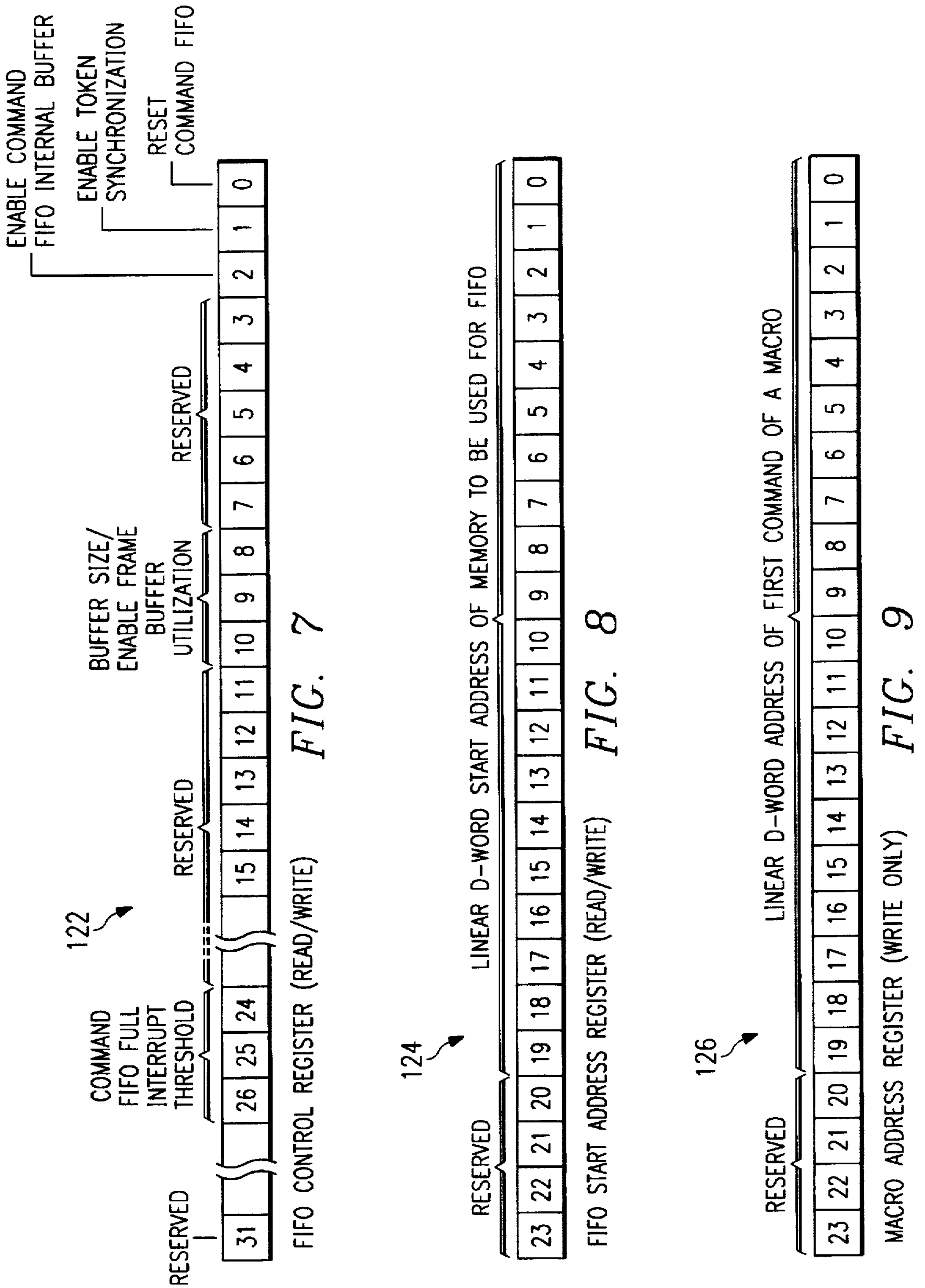
FIG. 7 is an illustration showing the FIFO control register of FIG. 6 in more detail.
FIG. 8 is an illustration showing the FIFO start address register of FIG. 6 in more detail.
FIG. 9 is an illustration showing the macro address register of FIG. 6 in more detail.

FIG. 7 is a block diagram illustrating FIFO control register 122 in more detail. FIFO control register 122 is a 16-bit read/write register. Bits 8, 9 and 10, when non-zero, indicate the size of dynamic command FIFO 84. A zero value in bits 8, 9 and 10 indicates that utilization of dynamic command FIFO 84 is not enabled. Bit 2 indicates whether command buffer 72 is to. be used in the normal operation of graphics controller 60, or whether command buffer 72 should be placed always in bypass mode. When the utilization of dynamic command FIFO 84 is disabled and command buffer 72 is placed always in bypass mode, graphics controller 60 operates in a fashion that is backwardscompatible with previous-generation graphics controllers such as graphics controller 30. Bits 1 and 0 are for enabling/disabling token synchronization (discussed below) and for resetting dynamic command FIFO 84, respectively.

FIG. 8 is a block diagram illustrating FIFO start address register 124 in more detail. FIFO start address register 124 is a 24-bit read/write register. Bits 0–19 store the linear D-word start address within VRAM 42 for dynamic command FIFO 84 (or, alternatively, a value from which that address may be calculated).

FIG. 9 is a block diagram illustrating macro address register 126 in more detail. Macro address register 126 is a 24-bit write-only register. A write to this register indicates that a macro is to be executed by graphics controller 60. Bits 0–20 indicate the linear D-word address in VRAM 42 of the first command of the macro to be executed (or, alternatively, a value from which that address may be calculated).

Figure 10:
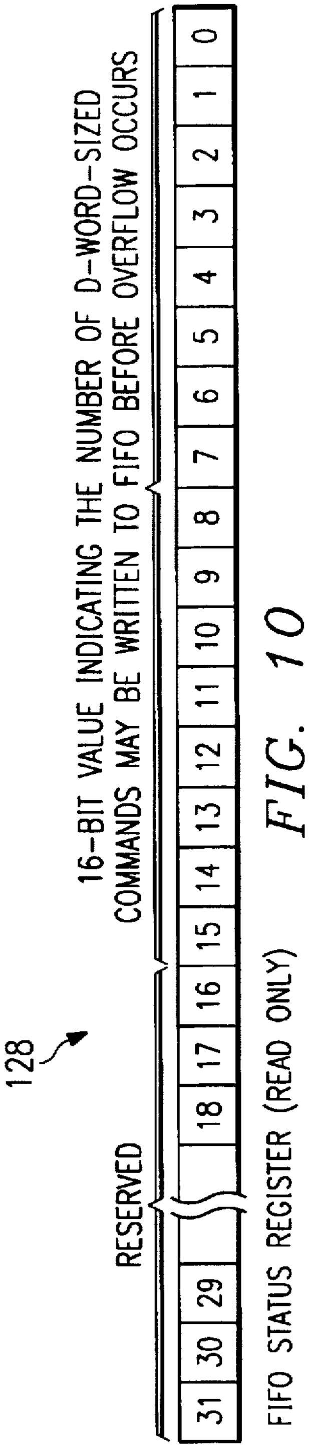
FIG. 10 is an illustration showing the FIFO status register of FIG. 6 in more detail.

FIG. 10 is a block diagram illustrating FIFO status register 128 in more detail. FIFO status register 128 is a 32-bit read-only register. Bits 0–16 store a value indicating the number of D-word-sized commands that may be written to dynamic command FIFO 84 at a given time without causing an overflow.

Figure 11:
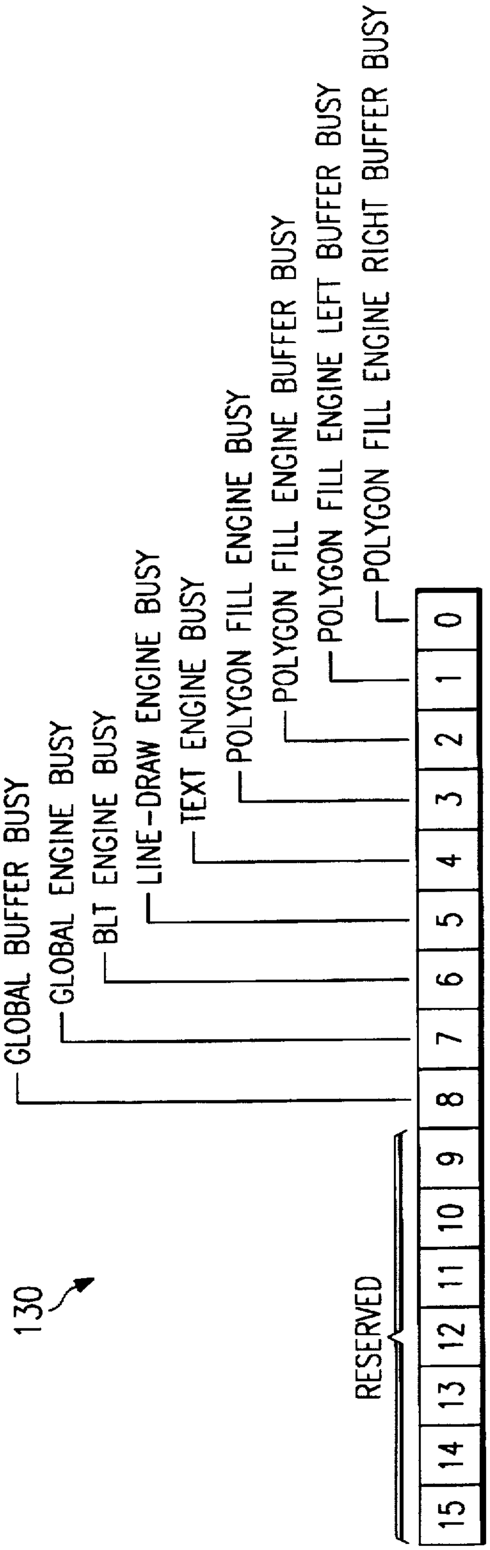
FIG. 11 is an illustration showing the polling token register of FIG. 6 in more detail.

FIG. 11 is a block diagram illustrating polling token register 130 in more detail. Polling token register 130 is a 16-bit write-only register. Data written by the CPU to bits 0–8 of this register serve as input information for busy status logic 114, as will be further discussed below in relation to software synchronization. In turn, the output of busy status logic 114 is used by state machine 98 to determine whether or not more commands may be sent to decoder 36 and graphics core 38 for execution. Bits 0 and 1 of polling token register 130 refer to the busy status of the right and left buffers of the polygon fill engine, respectively, while bit 2 refers globally (a logical "OR") to the busy status of both of those buffers. Bit 3 refers to the busy status of the polygon fill engine itself. Bit 4 refers to the busy status of the text engine. Bit 5 refers to the busy status of the line draw engine. Bit 6 refers to the busy status of the bit block transfer engine. Bit 7 refers globally (a logical "OR") to the busy status of the polygon fill engine, the text engine, the line draw engine and the bit block transfer engine. Bit 8 refers globally (a logical "OR") to the busy status of all buffers associated with all graphics engines. (In a preferred embodiment, the only engine without a buffer associated with it is the Text Engine.)

Operation of Enhanced Video Graphics System

Figure 12:
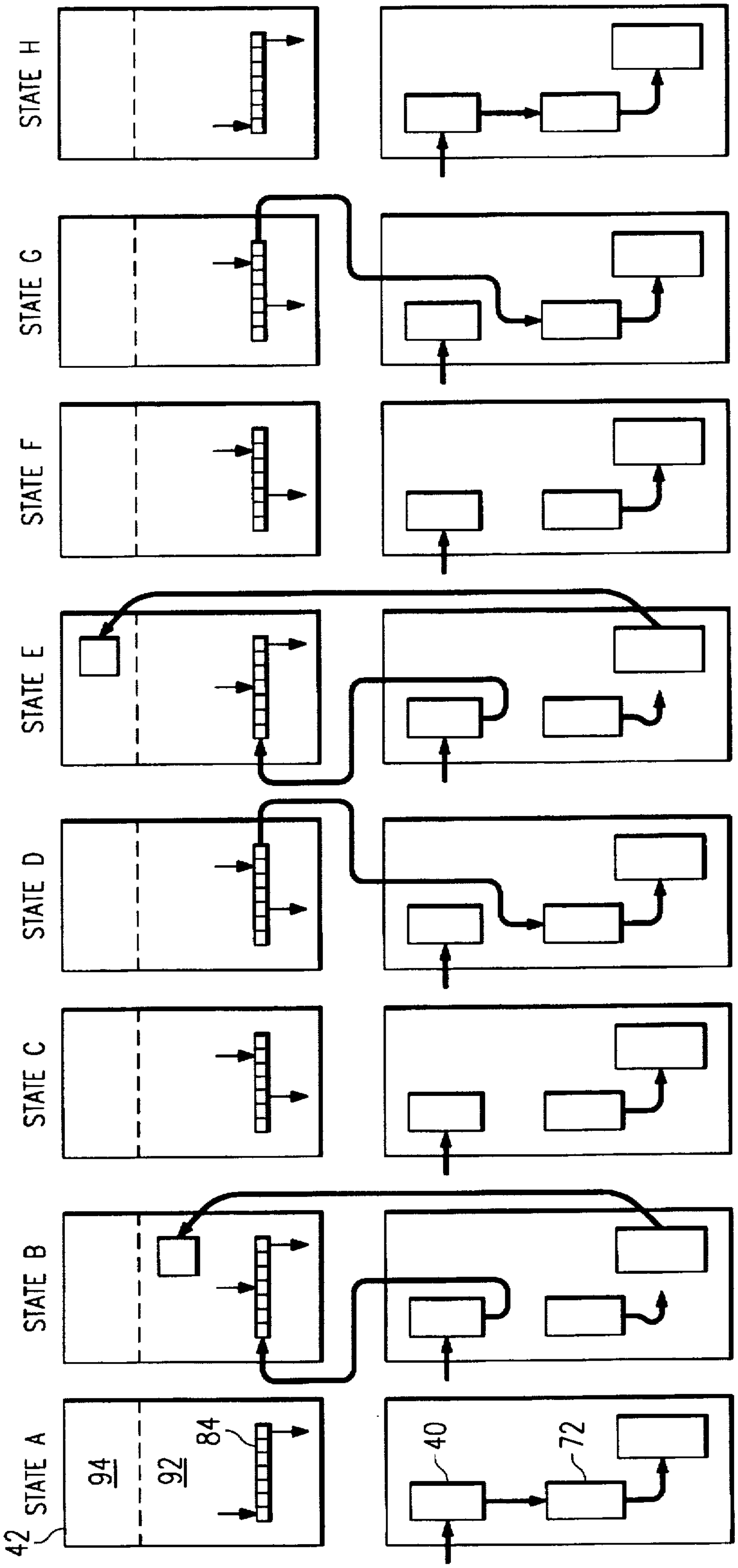
FIG. 12 is a block diagram illustrating the flow of commands during various states of operation in a graphics system according to a preferred embodiment of the invention.

The operation of a preferred embodiment of the invention may be visualized with reference to FIG. 12, in which states of operation A-H are illustrated. Prior to the operation illustrated in state A, software must of course initialize dynamic command FIFO 84 by defining its location in VRAM 42 and its size (setting size equal to a non-zero value also enables dynamic command FIFO 84). Once in state A, commands received from bus interface 34 pass first into bus FIFO 40, then into command buffer 72, and finally into decoder 36 for execution by graphics controller core 38. Graphics controller 60 will continue to operate in state A until either (1) a command is executed that starts one of the engines in controller core 38, or (2) a polling token is written into polling token register 130. When either of these conditions occurs, graphics controller 60 will begin to operate in state B. In state B, graphics controller core 38 is busy, and therefore no further commands are passed from command buffer 72 to decoder 36. Meanwhile, incoming commands received in bus FIFO 40 are transferred into dynamic command FIFO 84 in the off-screen portion 92 of VRAM 42. When graphics controller core 38 is idle once again, graphics controller 60 shifts into state C, in which commands that were stored in command buffer 72 awaiting execution are now transferred sequentially to decoder 36 for execution. Because commands exist in dynamic FIFO 84, however, no commands are allowed to pass from bus FIFO 40 directly into command buffer 72 while graphics controller 60 operates in state C. Eventually, command buffer 72 will be depleted in this manner, at which time graphics controller 60 shifts to state D. In state D, graphics controller 60 attempts to deplete dynamic command FIFO 84 by filling command buffer 72 from dynamic command FIFO 84. When command buffer 72 is full, graphics controller 60 once again operates as in state C, shifting back and forth between states D and C until the entire dynamic command FIFO 84 is depleted or until controller core 38 becomes busy again. If controller core once again becomes busy, as illustrated in state E, then once again commands are prevented from passing from command buffer 72 into decoder 36, while new incoming commands pass through bus FIFO 40 and into dynamic command FIFO 84. When controller core 38 is no longer busy, graphics controller 60 will alternate between states F and G (analogous to states C and D) attempting to deplete dynamic command FIFO 84. If all commands stored in dynamic command FIFO 84 are executed, then operation resumes in state H precisely as it did in state A.

An exception to the above-described operational sequence is for "immediate commands." If graphics controller 60 detects a read command coming from bus interface 34 and determines that the read command can be executed immediately (and therefore a bus "retry" is not necessary), then command FIFO controller 74 will place both bus FIFO 40 and command buffer 72 in bypass mode so that the read command may pass directly to decoder 36 for execution. If graphics controller 60 detects an immediate write command coming from bus interface 34, then a flush operation begins. During a flush, any nonimmediate commands in bus FIFO 40 will be passed to command buffer 72 as long as command buffer 72 is not full. If command buffer 72 is full, nonimmediate commands in bus FIFO 40 will be passed to dynamic command FIFO 84. Command buffer 72 is placed in bypass mode at all times when immediate commands are being processed (both when read commands are being processed and when immediate writes are being processed). It should be noted that some read operations are so urgent that they may preferably be decoded specially and processed directly without using either bus FIFO 40 or command buffer 72.

An example of such an urgent read would be a read of FIFO space available during a FIFO-full interrupt service. It should be noted that bits 24–26 in FIFO control register 122 determine the threshold at which the CMD FIFO INTERRUPT signal will be asserted. For example, a binary value of "111" in bits 24–26 will cause the interrupt to be generated when there is only room enough for 256 more commands to be stored in dynamic command FIFO 84. A binary value of "000" in those bits will cause the interrupt to be generated when there is only room enough for 32 more commands to be stored in dynamic command FIFO 84. When status generation logic 112 determines that CMD FIFO SPACE AVAILABLE is less than the threshold number of commands, CMD FIFO INTERRUPT is asserted. This enables the software interrupt service routine to solve the problem before an overflow actually occurs.

It should also be noted that, if dynamic command FIFO 84 is not enabled, then no immediate commands will be executed out of order relative to non-immediate commands. Thus, either graphics controller 60 should cease accepting further commands until all immediate commands have been executed, or software should make certain not to issue further commands until all immediate commands have had time to execute.

The use of two on-chip FIFOs (bus FIFO 40 and command FIFO 72), instead of one, provides a distinct advantage when implementing the invention because the twin FIFOs enable burst mode data transfers to be used for all command movement. Bus FIFO 40 enables burst mode data transfers from bus 16 into graphics controller 60, and command buffer 72 enables burst mode memory accesses for all command traffic between graphics controller 60 and VRAM 42. Burst mode transfers enhance system performance by virtue of reduced overhead per data word transferred.

It should be noted that, preferably, commands stored in dynamic command FIFO 84 are stored in contiguous memory locations. The same is true for commands stored as macros in VRAM 42 (although each macro need not be contiguous with other macros). For this reason, special modes commonly found in graphics controllers such as "data expand" modes should be turned off or overridden while commands are being read from or written to VRAM 42. It is contemplated, however, that the method and apparatus of the invention may be implemented by using non-contiguous locations in VRAM 42, in which case such modes may not need to be turned off while reading commands from and writing commands to VRAM 42.

Software Synchronization Modes

In a preferred embodiment of the invention, there are two methods by which synchronization may be achieved between the video driver software and graphics controller 60 when dynamic command FIFO 84 is enabled. The two methods will be referred to herein as default mode and polling token mode. In default mode, busy status logic 114 will cause state machine 98 to cease from transferring any further commands from command buffer 72 to decoder 36 and graphics core 38 for as long as any of the engines remain busy, as indicated by the busy signals that are inputs to busy status logic 114. In polling token mode, state machine 98 will continuously transfer commands from command buffer 72 to decoder 36 and graphics core 38 until decoder 36 and graphics core 38 encounter a command that writes data to polling token register 130. (Busy status logic 114 detects this event via the polling token register write signal.) When such a write has been executed, state machine 98 will cease transferring further commands from command buffer 72 to decoder 36 and graphics core 38 while it makes a comparison between the data written to polling token register 130 and the corresponding busy signals. State machine 98 will resume transferring commands only after the component referred to by the polling token data is polled inactive.

Video Macro Commands

Figure 13:
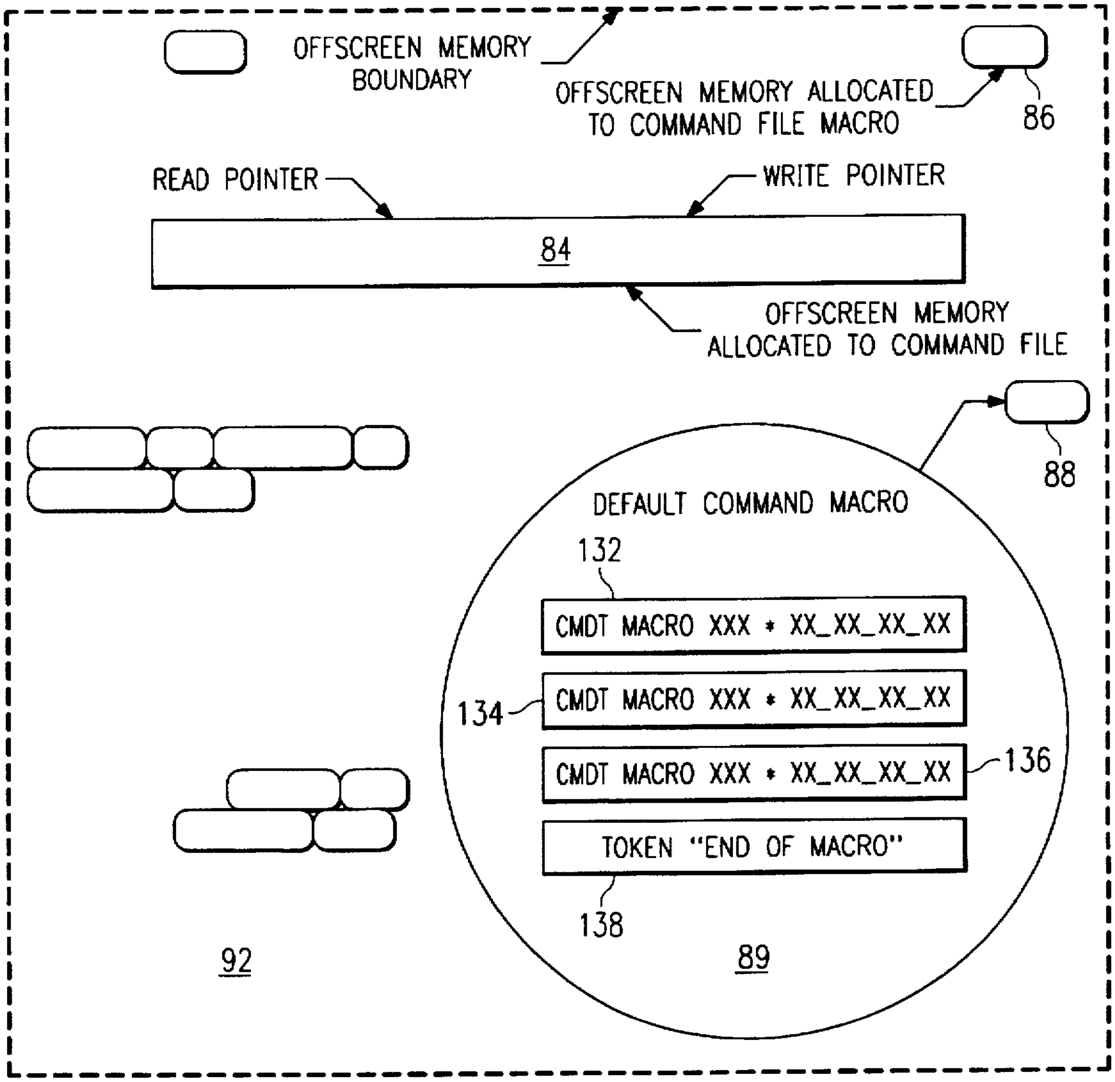
FIG. 13 is a diagram illustrating one example of allocating portions of video memory to a FIFO buffer and to command macros according to a preferred embodiment of the invention.

The implementation of video macro command capability will now be described in relation to FIGS. 13–15. FIG. 13 is a representation of off-screen portion 92 of VRAM 42. Within off-screen portion 92 can be seen dynamic command FIFO 84 as well as exemplary macros 86 and 88. It will, of course, be understood that the number of macros actually stored in off-screen memory 92, as well as their location, may vary from time to time.

Macro 88 is shown in greater detail in expanded view 89. Macro 88 comprises command 132, command 134, command 136 and command 138, all stored sequentially in memory 92. Each of commands 132–138 may be any operation normally needed within graphics system 50 such as writes to control and status registers 52 and 53. Command 138 is special in that its format indicates to graphics controller 60 that it is the last command in macro 88. Thus, once graphics controller has executed commands 132–136 and encounters command 138, command execution will return to normal.

Figure 14:
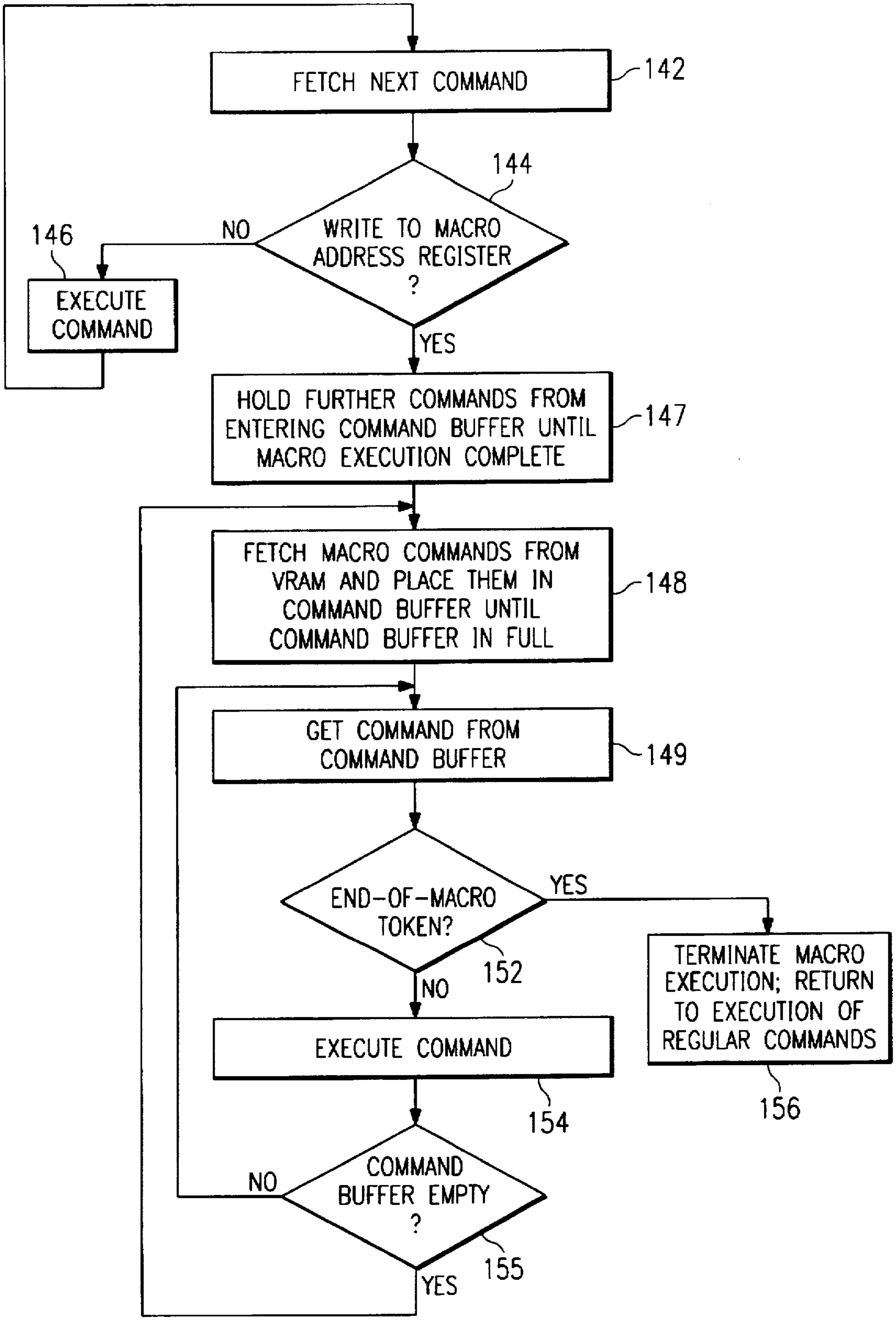
FIG. 14 is a flow chart illustrating the execution of commands, including macro commands, according to a preferred embodiment of the invention.

FIG. 14 is a flow chart illustrating the preferred command execution procedure for implementing video macro command capability in video graphics system 50. Beginning with step 142, graphics controller 60 fetches a command to be placed in command buffer 72. In step 144, graphics controller 60 determines whether or not the fetched command is a write to macro address register 126. If not, then the fetched command will be executed in due course in step 146. If graphics controller 60 determines in step 144, however, that the fetched command was a write to macro address register 126, then macro execution begins with step 147. In step 147, MACRO START is asserted and further commands will not be placed into command buffer 72 until macro execution is completed. In step 148, graphics controller 60 retrieves commands from VRAM 42 beginning at the address specified in macro address register 126, and places the commands in command buffer 72 until command buffer 72 is full. (Fetching commands in this burst manner provides greater efficiency during the memory access.) In step 149, graphics controller 60 begins executing the macro instructions stored in command buffer 72 by getting a command out of command buffer 72. In step 152, the command is analyzed to determine if it is an end-of-macro token. If not, then the command is executed in step 154. Then, if command buffer 72 is empty, it will be filled again in step 148 with more commands stored sequentially in VRAM 42. If command buffer 72 is not empty, macro execution continues by repeating step 149. In step 152, if an end-of-macro token is detected, then macro execution is terminated in step 156 and normal command execution resumes. (Any remaining data in command buffer 72 after the end-of-macro token is detected may be dumped.) It should be noted that command FIFO controller 74 issues the requisite control signals to implement the above flow of command execution while macro commands are fetched from VRAM 42 and executed.

FIG. 15 illustrates a preferred bit field specification for the commands that will form a macro. Bits 63–60 indicate which of the bytes in bits 31–0 will be written, while bits 31–0 contain the actual write data. Bit 59, if zero, transforms the command into an end-of-macro token. Bit 58 indicates whether the command is a Dumb Frame Buffer access or an access to other memory. Bit 57 indicates a write to programmable ROM. Bit 56 indicates whether low or high map areas are being accessed by the command. Bits 55–34 contain the target address for command execution, subject to translation. Bits 33 and 32 indicate the cycle type of the command, e.g., host memory cycle, I/O register cycle or other cycle type.

By providing video macro command capability, the invention confers numerous advantages to graphics system performance. Macro command capability enables software to communicate multiple commands (bus writes) to graphics controller 60 with only a single bus write; graphics controller 60 then effectively expands the single bus write into the multiple commands that the software actually requires. This enhances overall system performance by reducing the number of bus writes to graphics controller 60. In addition, command FIFO controller 74 will have to interrupt other processes for memory writes less frequently, and dynamic command FIFO 84 will fill more slowly. Moreover, flexibility is achieved in that off-screen memory 92 may be allocated to macros in varying amounts and locations (thus providing flexible video memory utilization), and the macros themselves are completely user-definable.

FIFO Controller State Machine

Figure 16:
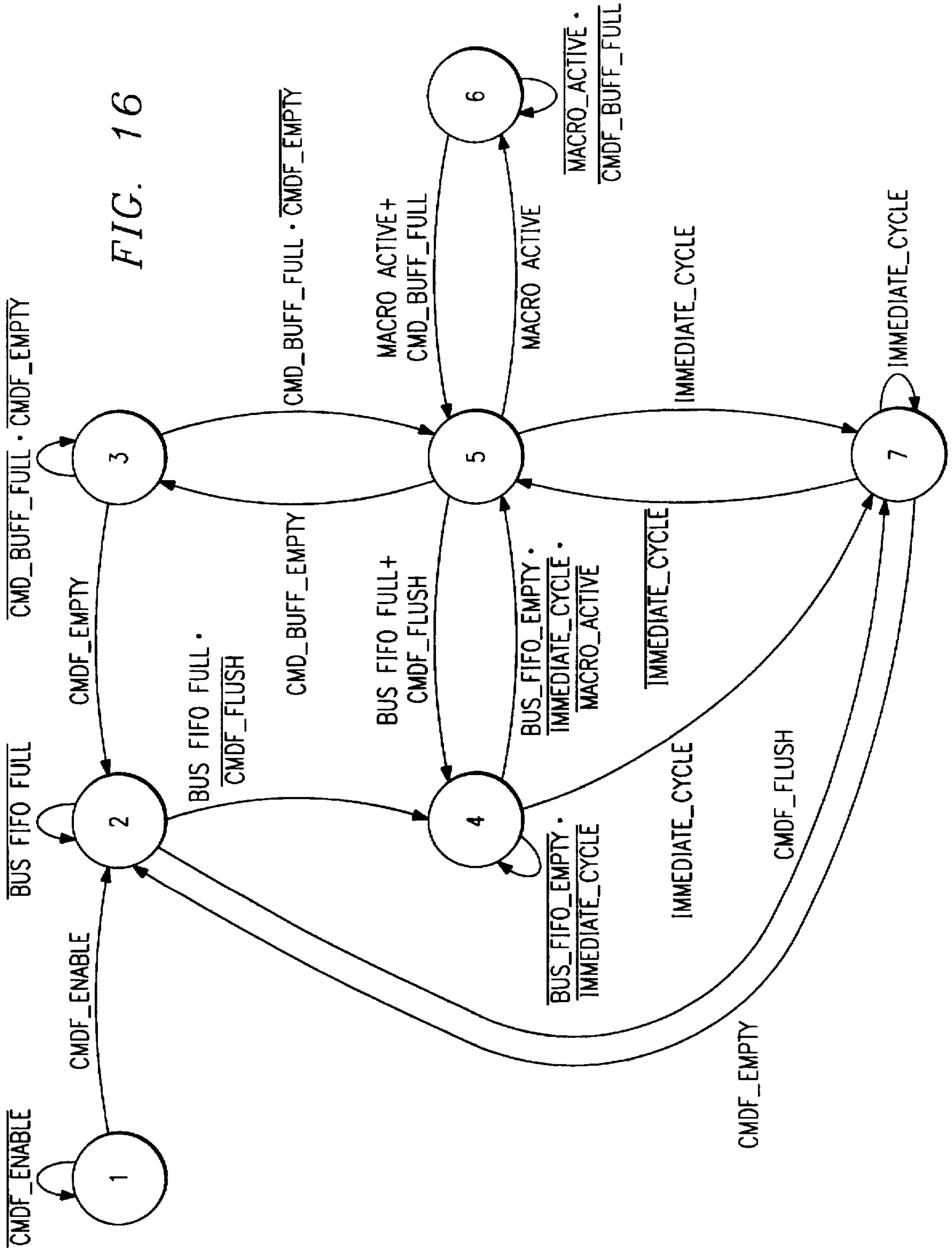
FIG. 16 is a state diagram illustrating the preferred operation of the command FIFO controller of FIG. 5.

Although state machines and corresponding hardware of various designs may be used to implement the inventive functionality described above, the state diagram of FIG. 16 is provided to illustrate a preferred embodiment of state machine 98. The state diagram of FIG. 16 is simplified for clarity. It will be understood, however, that each of the states illustrated therein corresponds to a number of sub-states in which command FIFO controller 74 manipulates bus FIFO 40, command buffer 72 and multiplexers 76, 78, 82 and 96 in order to achieve the overall results described for the illustrated state.

In state 1, dynamic command FIFO 84 is not enabled. Thus, in state 1, graphics controller 60 may operate in a manner that is downward-compatible with graphics controllers that do not utilize off-chip command buffering. As commands are received from bus interface 34, they are transferred first into bus FIFO 40, then into command buffer 72, and finally into decoder 36. In states 2–7, off-chip command buffering is enabled. After offchip command buffering has been enabled and state machine 98 has passed from state 1 to state 2, state machine 98 will remain in state 2 until bus FIFO 40 is full, at which time state machine 98 will transition to state 4. The exception to this is when a FIFO FLUSH is requested, in which case state machine 98 transitions to state 7. In state 2, command flow is the same as that of state 1 because dynamic command FIFO 84 is empty. In state 3, commands are transferred from dynamic command FIFO 84 into command buffer 72 until either command buffer 72 becomes full or dynamic command FIFO 84 becomes empty. In state 4, commands are transferred from bus FIFO 40 to dynamic command FIFO 84 until either bus FIFO 40 is empty or an immediate cycle is detected. In state 5, stored commands exist in dynamic command FIFO 84; thus, command FIFO controller 98 waits until a further transfer of commands is required either to or from dynamic command FIFO 84. In state 6, macro commands are transferred from VRAM 42 into command buffer 72 until either command buffer 72 is full or an end-of-macro token is encountered. In state 7, immediate commands are executed by transferring the commands directly from bus interface 34 to decoder 36 through bus FIFO 40 and command buffer 72 while bus FIFO 40 and command buffer 72 are placed in bypass mode.

Special Considerations

It is believed that, in order to safely accomplish a read from VRAM 42 while dynamic command FIFO 84 is enabled, software should first wait for dynamic command FIFO 84 to empty before attempting the read. Also, for large bit block transfers, it is believed that superior performance may be achieved by first waiting for dynamic command FIFO 84 to empty and then disabling it before proceeding with the transfer. To successfully accomplish writes to graphics controller 60 where the write operation is dependent on knowing the state of certain bits in a graphics system register or location, either software should maintain a record of the last value written to that register/location or it should wait until dynamic command FIFO 84 is empty before reading/writing the register/location. Likewise, writes to FIFO start address register 124 and FIFO control register 122 should be done when dynamic command FIFO 84 is empty. Because additional status and control registers 53 are memory-mapped I/O registers, care should be taken when writing a register that changes address decoding. Before performing such a write, software should wait until dynamic command FIFO 84 is empty and then disable it. Finally, writes to the video enable register (IO 46E8h) should cause the entire command buffering system to be reset. This is necessary because buffered commands requiring CPU intervention (such as incomplete CPU to screen bit block transfers), if not discarded, could "hang" the computer system during a warm reboot.

While the invention has been described in detail with reference to preferred embodiments thereof it will be understood by those having ordinary skill in the art that various changes, substitutions and alterations can be made therein without departing from the spirit and scope of the invention as defined by the following claims.

We claim:

1. For use in a computer graphics system comprising a bus interface; a video memory; a video memory controller circuitry having a memory controller address input for receiving addresses corresponding to locations within said video memory, a memory controller data input for receiving data to be written to said video memory, and a memory controller data output for outputting data read from said video memory; a decoder circuitry having a decoder input, a decoder address output and a decoder data output, said decoder address output and said decoder data output responsive to graphics commands presented to said decoder input; a first command path over which commands are transferrable from said bus interface to said decoder input; a first address path over which addresses are transferrable from said decoder address output to said memory controller address input; and a data path over which data are transferrable from said decoder data output to said memory controller data input; the improvement comprising circuitry for implementing a graphics command buffer using a portion of said video memory, said circuitry for implementing a graphics command buffer comprising:

FIFO address generation circuitry for generating read and write addresses corresponding to locations within said video memory that will be used for implementing the graphics command buffer, said FIFO address generation circuitry having a FIFO address output;

a second address path over which addresses are transferrable from said FIFO address output to said memory controller address input;

a second command path over which commands are transferrable from said memory controller output to said decoder input;

a node dividing said first command path into first and second portions, said first portion being between said bus interface and said node, and said second portion being between said node and said decoder input; and a third command path over which commands are transferrable from said node to said memory controller data input.

2. Circuitry as recited in claim 1 for implementing a graphics command buffer, wherein said first and second address paths comprise address multiplexer circuitry having a first address multiplexer circuitry input coupled to said FIFO address output, a second address multiplexer circuitry input coupled to said decoder address output, and an address multiplexer circuitry output coupled to said memory controller address input.

3. Circuitry as recited in claim 1 for implementing a graphics command buffer, wherein said third command path and said data path comprise a decoder data multiplexer circuitry having a first decoder data multiplexer circuitry input coupled to said decoder data output, a second decoder data multiplexer circuitry input coupled to said node, and a decoder data multiplexer circuitry output coupled to said memory controller data input.

4. Circuitry as recited in claim 1 for implementing a graphics command buffer, wherein said first and second command paths comprise a command multiplexer circuitry having a first command multiplexer circuitry input coupled to said node, a second command multiplexer circuitry input coupled to said memory controller data output, and a command multiplexer circuitry output coupled to said decoder input.

5. Circuitry as recited in claim 2 for implementing a graphics command buffer, wherein said third command path and said data path comprise a decoder data multiplexer circuitry having a first decoder data multiplexer circuitry input coupled to said decoder data output, a second decoder data multiplexer circuitry input coupled to said node, and a decoder data multiplexer circuitry output coupled to said memory controller data input.

6. Circuitry as recited in claim 5 for implementing a graphics command buffer, wherein said first and second command paths comprise a command multiplexer circuitry having a first command multiplexer circuitry input coupled to said node, a second command multiplexer circuitry input coupled to said memory controller data output, and a command multiplexer circuitry output coupled to said decoder input.

7. Circuitry as recited in claim 1 for implementing a graphics command buffer, wherein said first portion of said first command path comprises a first FIFO buffer.

8. Circuitry as recited in claim 7 for implementing a graphics command buffer, wherein said second portion of said first command path comprises a second FIFO buffer.

9. Circuitry as recited in claim 1 for implementing a graphics command buffer, wherein said second portion of said first command path comprises a second FIFO buffer.

10. A method of buffering a command in a computer graphics system operable with a bus and having a graphics controller and a video memory, said method comprising the steps of:

receiving the command from the bus;

determining whether the command should be executed immediately or whether the command could be buffered;

if the command could be buffered:

storing the command in the video memory; and retrieving the command from the video memory;

if the command could not be buffered:

placing a first and a second FIFO buffer into a bypass mode of operation; and routing the command through the first and second FIFO buffers, thereby immediately processing the command.

11. The method of claim 10, further comprising the step of:

if the outcome of said determining step indicated that the command could be buffered, storing the command in said first FIFO buffer within the graphics controller after said determining step but before said step of storing the command in the video memory.

12. The method of claim 10, further comprising the step of:

if the outcome of said determining step indicated that the command could be buffered, storing the command in said second FIFO buffer within the graphics controller after said retrieving step.

13. The method of claim 10, wherein said step of storing the command in the video memory comprises storing the command in a third FIFO buffer implemented using a portion of the video memory.

14. A computer graphics system comprising:

a bus interface;

a video memory communicating with said bus interface;

a video memory controller circuitry having a memory controller address input for receiving addresses corresponding to locations within said video memory;

a memory controller data input for receiving data to be written to said video memory;

a memory controller data output for outputting data read from said video memory;

decoder circuitry having a decoder input, a decoder address output and a decoder data output, said decoder address output and said decoder data output responsive to graphics commands presented to said decoder input;

a first command path over which commands are transferrable from said bus interface to said decoder input;

a first address path over which addresses are transferrable from said decoder address output to said memory controller address input;

a data path over which data are transferrable from said decoder data output to said memory controller data input; and circuitry for implementing a graphics command buffer using a portion of said video memory, said circuitry for implementing a graphics command buffer comprising:

FIFO address generation circuitry for generating read and write addresses corresponding to locations within said video memory that will be used for implementing the graphics command buffer, said FIFO address generation circuitry having a FIFO address output;

a second address path over which addresses are transferrable from said FIFO address output to said memory controller address input;

a second command path over which commands are transferrable from said memory controller output to said decoder input;

a node dividing said first command path into first and second portions, said first portion being between said bus interface and said node, and said second portion being between said node and said decoder input; and a third command path over which commands are transferrable from said node to said memory controller data input.

15. The computer graphics system of claim 14, wherein said first and second address paths of said circuitry for implementing a graphics command buffer comprise address multiplexer circuitry having a first address multiplexer circuitry input coupled to said FIFO address output, a second address multiplexer circuitry input coupled to said decoder address output, and an address multiplexer circuitry output coupled to said memory controller address input.

16. The computer graphics system of claim 15, wherein said third command path and said data path of said circuitry for implementing a graphics command buffer comprise a decoder data multiplexer circuitry having a first decoder data multiplexer circuitry input coupled to said decoder data output, a second decoder data multiplexer circuitry input coupled to said node, and a decoder data multiplexer circuitry output coupled to said memory controller data input.

17. The computer graphics system of claim 16, wherein said first and second command paths of said circuitry for implementing a graphics command buffer comprise a command multiplexer circuitry having a first command multiplexer circuitry input coupled to said node, a second command multiplexer circuitry input coupled to said memory controller data output, and a command multiplexer circuitry output coupled to said decoder input.

18. The computer graphics system of claim 14, wherein said third command path and said data path of said circuitry for implementing a graphics command buffer comprise a decoder data multiplexer circuitry having a first decoder data multiplexer circuitry input coupled to said decoder data output, a second decoder data multiplexer circuitry input coupled to said node, and a decoder data multiplexer circuitry output coupled to said memory controller data input.

19. The computer graphics system of claim 14, wherein said first and second command paths of said circuitry for implementing a graphics command buffer comprise a command multiplexer circuitry having a first command multiplexer circuitry input coupled to said node, a second command multiplexer circuitry input coupled to said memory controller data output, and a command multiplexer circuitry output coupled to said decoder input.

20. The computer graphics system of claim 14, wherein said first portion of said first command path of said circuitry for implementing a graphics command buffer comprises a first FIFO buffer.

21. The computer graphics system of claim 20, wherein said second portion of said first command path of said circuitry for implementing a graphics command buffer comprises a second FIFO buffer.

22. The computer graphics system of claim 14, wherein said second portion of said first command path of said circuitry for implementing a graphics command buffer comprises a second FIFO buffer.

* * * * *

UNITED STATES PATENT AND TRADEMARK OFFICE

CERTIFICATE OF CORRECTION

PATENT NO. : 5,796,413

DATED : August 18, 1998

INVENTOR(S) : Ronald Anthony Shipp; Stuart Hecht; Patrick Allen Harkin

It is certified that error appears in the above-identified patent and that said Letters Patent is hereby corrected as shown below:

Col. 1, line 23: delete "Some bus protocol", insert -- Some bus protocols, --.
Col. 8, line 40: delete "more detail As", insert -- more detail. As --.
Col. 8, line 52: delete "for Systems", insert -- for systems --.
Col. 15, line 36: delete "in claim 7", insert -- in claim 1 --.
Col. 15, line 39: delete "in claim 1", insert -- in claim 7 --.

Signed and Sealed this

Twenty-second Day of December, 1998

*Attest:*

BRUCE LEHMAN

*Attesting Officer*

*Commissioner of Patents and Trademarks*